(12) United States Patent
Kaio

(10) Patent No.: US 10,042,034 B2
(45) Date of Patent: Aug. 7, 2018

(54) SEARCH/RESCUE SYSTEM

(71) Applicant: SKYROBOT INC., Tokyo (JP)

(72) Inventor: Daisuke Kaio, Kanagawa (JP)

(73) Assignee: SKYROBOT INC., Tokyo (JP)

( * ) Notice: Subject to any disclaimer, the term of this patent is extended or adjusted under 35 U.S.C. 154(b) by 0 days.

(21) Appl. No.: 15/552,799

(22) PCT Filed: Mar. 11, 2015

(86) PCT No.: PCT/JP2015/001345
§ 371 (c)(1),
(2) Date: Aug. 22, 2017

(87) PCT Pub. No.: WO2016/142967
PCT Pub. Date: Sep. 15, 2016

(65) Prior Publication Data
US 2018/0128894 A1    May 10, 2018

(51) Int. Cl.
| | |
|---|---|
| *H04M 11/04* | (2006.01) |
| *G01S 5/02* | (2010.01) |
| *H04W 40/14* | (2009.01) |
| *G01S 5/00* | (2006.01) |
| *H04B 17/21* | (2015.01) |
| *H04B 17/11* | (2015.01) |
| *H04B 17/24* | (2015.01) |
| *H04B 17/27* | (2015.01) |

(52) U.S. Cl.
CPC .......... *G01S 5/0231* (2013.01); *G01S 5/0081* (2013.01); *G01S 5/0221* (2013.01); *H04B 17/11* (2015.01); *H04B 17/21* (2015.01); *H04B 17/24* (2015.01); *H04B 17/27* (2015.01); *H04W 40/14* (2013.01)

(58) Field of Classification Search
CPC .................................................. G01S 5/0231
USPC ........................................................ 455/404.2
See application file for complete search history.

(56) References Cited

U.S. PATENT DOCUMENTS

2005/0265326 A1* 12/2005 Laliberte ............... H04M 7/006
370/389

FOREIGN PATENT DOCUMENTS

| JP | 2002-342858 A | 11/2002 |
|---|---|---|
| JP | 2005-229449 A | 8/2005 |

OTHER PUBLICATIONS

Kai et al., "AirShield: A system-of-systems MUAV remote sensing architecture for disaster response," 2009 3rd Annual IEEE Systems Conference, Mar. 23-26, 2009, pp. 196-200, IEEE.

* cited by examiner

*Primary Examiner* — Joel Ajayi
(74) *Attorney, Agent, or Firm* — Im IP Law; C. Andrew Im

(57) ABSTRACT

Search and rescue system ascertain the existence of a lost article/person using an electrical signal transmitted from a signal transmitter carried by the lost article/person. The position of the lost article/person is transmitted through a network. Search and rescue system include a signal generator, one or more search target finder, a position measurer, and a network. The search target finder ascertains presence of a search target by receiving an electrical signal. An analyzer analyzes the received electrical signal and generates an analysis signal in response to a determination that the received electrical signal is a signal transmitted from the signal generator. The analysis signal is transmitted to another search target finder or the position measurer via the network. The position measurer confirms existence of the search target, detects interruption in analysis signal reception, and controls the communication route of the analysis signal to maintain analysis signal acquisition.

2 Claims, 1 Drawing Sheet

US 10,042,034 B2

SEARCH/RESCUE SYSTEM

RELATED APPLICATIONS

This application is a § 371 application from PCT/JP2015/001345 filed Mar. 11, 2015, which is herein incorporated by reference in its entirety.

TECHNICAL FIELD

The present invention relates to a system for searching for and determining the position of a lost person or other search target, particularly to a search and rescue system that enables the position of a lost article or lost person to be ascertained with the aid of an electrical signal transmitted from a signal transmitting device carried by the lost article or lost person and that upon finding the lost article or lost person enables the position of the lost article or lost person to be easily and rapidly ascertained via a network.

BACKGROUND ART

Various measures have been developed for discovering lost articles or lost persons and determining the locations thereof, and systems have been developed and put to use with attention to the efficiency, speed, accuracy and reliability of determining the locations of lost articles and lost persons. Particularly as regards finding lost persons in mountain rescue operations and similar, a system that excels in flexibility and efficiency is required because the region searched is extremely expansive and rapid reliable discovery is essential.

JP2005-229449A, for example, teaches a technology related to a system for determining the position of a lost person. According to the disclosed technology, mountain climbers carry small transmitters functionally capable of transmitting multiple radio waves, and a lost climber is discovered by conducting a first search from the air by helicopter or the like relying on transmitted VHF-UHF band radio waves that travel long distances, where after a ground search team provided with distress area information through a distress relief center approaches the distress site and conducts a second search using MF band or MF band plus VHF-UHF band radio waves. It is suggested that this technology can help to rescue a disaster victim buried in snow, such as by an avalanche, because it enables quick determination of the victim's location.

This technology does in fact make it possible to grasp a disaster victim's whereabouts. However, with the disclosed system, since high-accuracy determination of a lost person's position is extremely difficult, the search has to be conducted based on very vague position information, so that a major problem emerges of the search team, among others, being exposed to the risk of a secondary disaster. Another intrinsic and fatal problem is that in a terrain that blocks radio wave propagation, even ascertaining the presence of the disaster victim may become impossible. In addition, the first search has a problem of poor efficiency because it is conducted solely by a helicopter or similar.

Moreover, JP2002-342858A teaches a technology related to a system wherein a discovery assist device carried by a sought person transmits current position information, an information management device detects distress possibility based on an activity plan, and sought person current position information is acquired from the discovery assist device and provided to a searcher, whereby search activity is supported, and when position information cannot be acquired from the discovery assist device, search activity is supported by guiding a mobile radio repeater and acquiring position information from the discovery assist device. It is suggested that when a possibility of distress arises, a rapid and suitable alert enables an efficient search to be conducted.

Although this technology might enable discovery of a sought person even in a case where current position information for the sought person cannot be acquired from the discovery assist device, it does not ensure rapid discovery of the sought person because if no activity plan of the sought person is available, it is very difficult to suitably guide the mobile radio repeater.

A need is therefore felt for a search and rescue system that can easily and accurately grasp existence of a lost article or lost person, and when the lost article or lost person is discovered, can calculate position of the lost article or lost person with high accuracy and rapidly determine and communicate its location.

Patent Document 1:
   JP2005-229449A
Patent Document 2:
   JP2002-342858A

OBJECT AND SUMMARY OF THE INVENTION

Problems to be Overcome by the Invention

This invention has as its object to provide a system for searching for and locating the position of a lost article, lost person or other search target, particularly a search and rescue system that enables the existence of a lost article or lost person to be easily ascertained with the aid of an electrical signal transmitted from a signal transmitting device carried by the lost article or lost person and that upon discovery of the lost article or lost person enables the position of the lost article or lost person to be transmitted through a network and easily and rapidly ascertained.

Means for Solving the Problem

In order to achieve the aforesaid object, the search and rescue system for finding a search target and measuring position thereof according to the present invention comprises:
   a signal generation device carried by a search target for transmitting an electrical signal;
   one or more search target finding units comprising electrical signal receiving means for receiving the electrical signal, analysis means for analyzing the electric signal and determining whether it is a signal transmitted from the signal generation device, analysis signal generation means for generating an analysis signal based on determination result, and communication means for transmitting/receiving the analysis signal through a network;
   position measuring means for receiving the analysis signal transmitted from the search target finding unit and measuring position of the search target; and a network configured by the signal generation device, the one or more search target finding units, and said position measuring means,
   wherein the search target finding unit ascertains presence of a search target by the electrical signal receiving means receiving an electrical signal intermittently or continuously transmitted from the signal generation device carried by the search target, the analysis means analyzes the electrical signal received by the electrical signal receiving means to analyze and determine whether it is an electrical signal transmitted from the signal generation device, the communication means responds to determination of it being a signal transmitted from the signal generation device by transmitting the analysis signal generated by the analysis signal generation means through the network to another search target finding unit or the position measuring means, the other search target finding unit receives the analysis signal transmitted from the search target finding unit and transmits it to another search target finding unit or the position measuring means, the position measuring means receives the analysis signal transmitted by the search target finding unit, confirms existence of the search target, detects interruption of analysis signal reception, and controls analysis signal communication route so as to continue analysis signal acquisition.

Moreover, the one or more search target finding units are mounted on movable mobile units and each search target finding unit is configured to communicate with other search target finding units or the position measuring means while moving.

The mobile units are configured as multiple aerial vehicles capable of flying movement.

The network comprising the signal generation device, search target finding unit and position measuring means constitutes a wireless network that has a mesh network configuration and is configured to enable arbitrary selection of electrical signal and analysis signal transmission paths from the signal generation device to the position measuring means.

In addition, the search target finding unit incorporates a GPS receiver, and when the electrical signal from the signal generation device is received, transmits position information of the search target finding unit acquired by the GPS receiver through the network to another search target finding unit or the position measuring means, and the position measuring means is further configured to receive multiple sets of position information transmitted from the search target finding units and analyze position of the search target by performing three-point measurement.

Effects of the Invention

Being configured in the foregoing manner, the present invention offers the following effects.

1. Since the search target finding unit is configured to analyze the electrical signal using the analysis means, whether or not the electrical signal is one transmitted from the signal generation device carried by the search target can be determined with high reliability. Further, since the signal generation device, search target finding unit and position measuring means constitute a network, the analysis signal can be quickly transmitted to the position measuring means. Moreover, the search target finding unit is configured to receive the analysis signal transmitted from another search target finding unit and transmit it to still another search target finding unit or the position measuring means, so that the analysis signal can be transmitted to the position measuring means without a break. Further, as the position measuring means is configured to detect interruption of analysis signal reception and control the communication route of the analysis signal, analysis signal acquisition can be continued without interruption, whereby the search target can be reached faster and more safely.

2. Since the search target finding units are mounted on the mobile units, a search can be conducted as each moving search target finding unit communicates with other search target finding units or the position measuring means, thereby imparting communication path fluidity and ensuring effective search performance.

3. Since the mobile units are constituted as mobile units capable of flying movement, freedom of network configuration can be enhanced.

4. As the network composed of the signal generation device, search target finding unit and position measuring means is constituted as a wireless mesh network, a network matched to any scale or range can be configured to enable arbitrary communication path selection.

5. The search target finding unit incorporates the GPS receiver, thereby enabling the position measuring means to receive multiple sets of position information and analyze the position of the search target by performing three-point measurement.

DETAILED DESCRIPTION OF THE EMBODIMENTS

Figure 1:
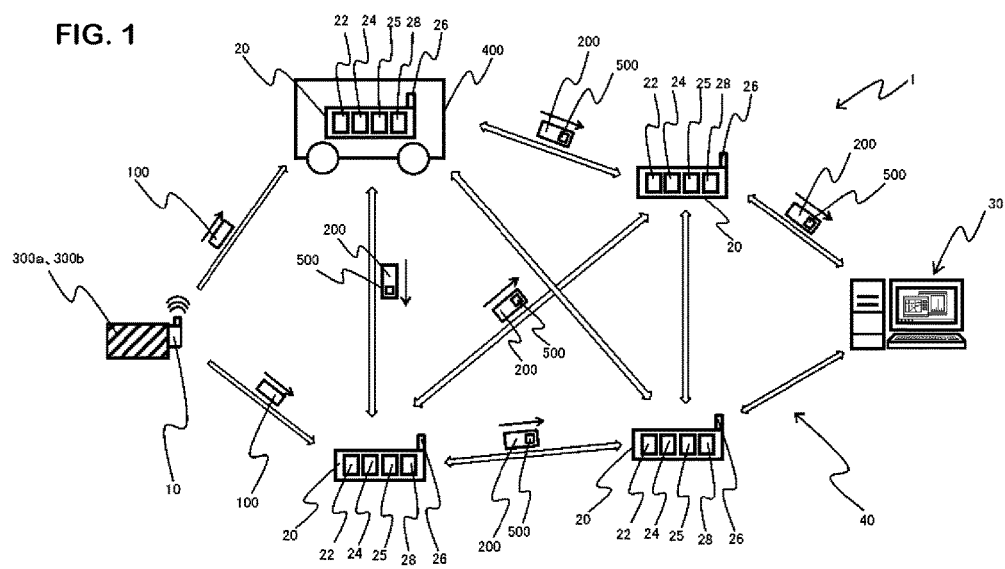
FIG. 1 is a schematic view of a search and rescue system according to the present invention.

The search and rescue system according to the present invention is explained in detail below based on an embodiment shown in the drawings. FIG. 1 is schematic view of a search and rescue system according to the present invention, and FIG. 2 is a schematic view of the search and rescue system during a search for a lost person.

Figure 2:
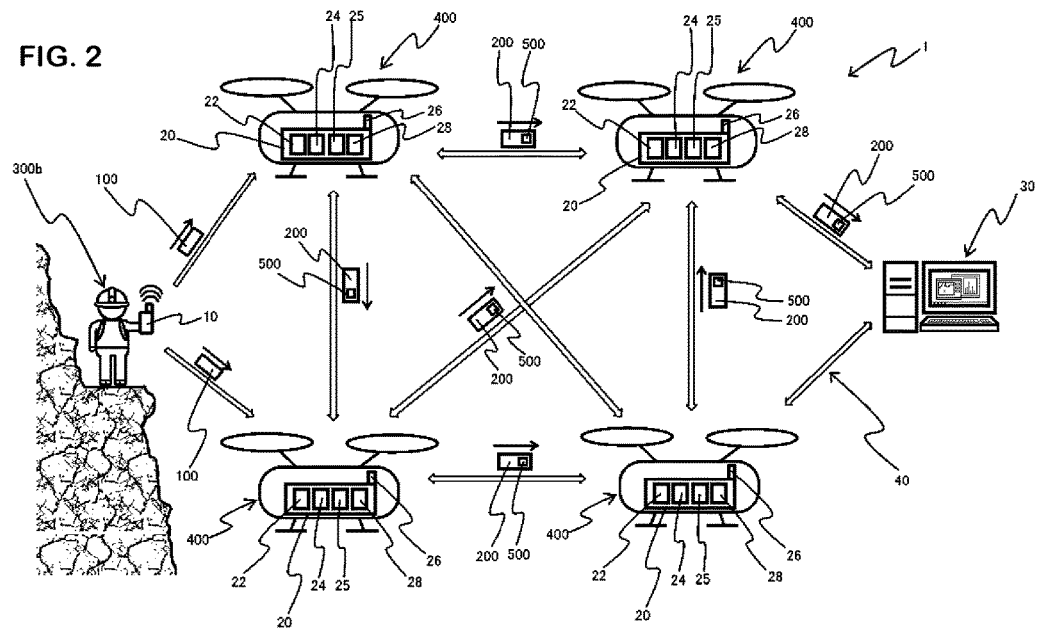
FIG. 2 is a schematic view of the search and rescue system during a search for a lost person.

As shown in FIGS. 1 and 2, a search and rescue system 1 according to the present invention comprises a signal generation device 10, search target finding units 20, position measuring means 30 and a network 40, and is a search and rescue system wherein an electrical signal 100 transmitted from the signal generation device 10 is received and analyzed by the search target finding units 20 and transmitted to the position measuring means 30, thereby finding a search target and measuring/determining its location. The search and rescue system 1 according to the present invention is directed to the purpose of analyzing and determining the location of an article or person that needs to be found, particularly to a system also useful for quickly finding disaster victims in mountainous areas or at sea.

The signal generation device 10 is a device carried by a lost article 300a, lost person 300b or other search target and is a telecommunications apparatus functionally capable of transmitting an electrical signal 100, as shown in FIG. 1. The signal generation device 10 is a device that transmits the electrical signal 100 continuously or intermittently, and in the present embodiment is an apparatus that performs communication in accordance with the BLUETOOTH® standard. The electrical signal 100 corresponds to radio waves in the 2.4 GHz frequency band and is constituted to connect receiving equipment by continuously or intermittently transmitting a lost signal or a distress signal (establishing so-called "search enabled state") in Bluetooth® pairing. Since radio field intensity is classified in Class 1 category, the configuration enables communication with equipment in a range of about 100 m from the location of the search target, but these are not restrictions, and it is possible to adopt a configuration for performing communication based on other specifications and/or communication standards.

In the present embodiment, the signal generation device 10 is used as carried by the lost article 300a or the lost person 300b. In the case of an object (lost article 300a), the signal generation device 10, which is constituted in a small transmitter version, is directly installed on the inside or outside of the object, and is configured such that radio waves (electrical signal 100) are transmitted from the signal generation device to establish search enabled state in Bluetooth® pairing. In the case of a person (lost person 300b), the lost person 300b is equipped with the signal generation device 10, which is constituted in a dedicated small-size transmitter version or incorporated in an on-person mobile telephone or the like, and is configured so that radio waves (electrical signal 100) transmitted from the signal generation device 10 establish search enabled state in BLUETOOTH® pairing, but it is not limited to this configuration and can be constituted for portability by some other method.

As shown in FIGS. 1 and 2, the search target finding unit 20 is a device for ascertaining existence of lost article 300a, lost person 300b or other search target by receiving the electrical signal 100 transmitted from the signal generation device 10, and the search and rescue system 1 according to present invention is configured to incorporate one or more search target finding units 20.

In the present embodiment, the search target finding unit 20 comprises electrical signal receiving means 22, analysis means 24, analysis signal generation means 25, and communication means 26. The electrical signal receiving means 22 is means for receiving the electrical signal 100 transmitted from the signal generation device 10, and in the present embodiment, it performs search operation for receiving the electrical signal 100 transmitted from the signal generation device 10 while moving.

If while performing moving search operation, the electrical signal receiving means 22 enters the range covered by the electrical signal 100 and receives the electrical signal 100 transmitted from the signal generation device 10 of the search target in search enabled state, whether the received electrical signal 100 is one transmitted from a search target (lost article 300a or lost person 300b) can be analyzed. The analysis means 24 analyzes the electrical signal 100 received by the electrical signal receiving means 22 to determine whether it is a signal transmitted from a search target (lost article 300a or lost person 300b).

In the present embodiment, since BLUETOOTH® is used, whether a signal is one transmitted from the signal generation device 10 can be determined by, for example, determining whether the signal generation device 10 matches a specific profile. In addition, that the electrical signal 100 was transmitted from the signal generation device 10 can be determined more certainly by comparing the fixed pass keys or input pass keys on the signal generation device 10 side and the search target finding unit 20 side. The electrical signal receiving means 22 and the analysis means 24 can be implemented either by separate devices or by an integrated device combining their functions.

The analysis signal generation means 25 is means for generating an analysis signal 200. In the present embodiment, when the analysis means 24 determines that the electrical signal 100 received by the electrical signal receiving means 22 is a signal transmitted from the signal generation device 10, the analysis signal generation means 25 generates the analysis signal 200. This condition means that existence of the search target (300a or 300b) nearby is being detected.

The analysis signal 200 is a signal indicating that the search target finding unit 20 is in a state of having received the electrical signal 100 transmitted from the signal generation device 10 (state of having detected existence of the search target), and when there are multiple search target finding units 20, the present embodiment can be configured to incorporate additional identification information for identifying by which analysis signal generation means 25 of the search target finding units 20 the analysis signal 200 was generated. By adopting this configuration, it is possible to identify which search target finding unit 20 detected the search target, so that even if the network 40 transmits multiple analysis signals 200, the source search target finding unit 20 of every analysis signal 200 can be determined. Moreover, owing to position information 500 additionally provided by the GPSes of the search target finding units 20, the position of the unit that detected the search target can be ascertained. Alternatively, a configuration is possible that does not add the aforesaid identification information and/or position information 500 to the analysis signal 200, but separately transmits them individually to the network 40.

The communication means 26 is means for transmitting the analysis signal 200 to the network 40 and means for receiving the analysis signal 200 through the network 40. In the present embodiment, the communication means 26 has transmit function for sending signals to the network 40 in order to send the analysis signal 200 generated by the analysis signal generation means 25 to another search target finding unit 20 as discussed later or to the position measuring means 30, and further has receive function for receiving an analysis signal 200 transmitted thereto from another search target finding unit 20 through the network 40 and has repeater function and route selection function for additionally sending the analysis signal 200 to an appropriate network 40. The communication means 26 can be configured to have packet communication function for dividing the analysis signal 200 into packets. A configuration additionally having defective packet retransmission function and/or error correction function is also possible. As such configurations reduce signal loss and/or transmission error, they can ensure reliable transmission of the analysis signal 200 to the position measuring means 30.

Also requiring attention is that the lost article 300a, lost person 300b or other search target might move. Moreover, in the present embodiment, the search target finding unit 20 can be capable of moving to search autonomously for the search target. Therefore, in the present embodiment, the communication means 26 is configured to continuously transmit the analysis signal 200 to the network 40 so as to continuously transmit the position information 500 to the search target finding unit 20. Owing to this configuration, even in a case where the search target moves, timely position information on the search target can be ascertained because the constantly changing position information 500 of the search target finding unit 20 continues to be transmitted while the search target finding unit 20 receives the electrical signal 100, and when movement of the search target and/or the search target finding unit 20 makes it impossible for the analysis signal generation means 25 of the search target finding unit 20 to receive the electrical signal 100 transmitted from the signal generation device 10 of the search target, transmission of the analysis signal 200 is discontinued (transmit cancel/discontinue signal sent), whereby undetectable state of the search target can be ascertained. Particularly worth noting is that when the analysis signal generation means 25 of the moving search target finding unit 20 becomes incapable of receiving the electrical signal 100, this means that position of the search target (typically the lost person 300b) receded (moved beyond the receivable range of the electrical signal 100, i.e., became distant by about 100 m or more in the case of BLUETOOTH®), thus offering a clue for determining where the search should be conducted.

The position measuring means 30 is means for receiving the analysis signal 200 from the search target finding unit 20 and measuring position of the lost article 300a, lost person 300b or other search target, and in the present embodiment, as shown in FIGS. 1 and 2, is constituted as a PC and other computer equipment installed, for example, at a lost article search center or disaster victim search base. In the present embodiment, the position measuring means 30 is configured to analyze the analysis signal 200 received through the network 40 using software installed in the PC and analyze/measure the position of the search target.

As explained earlier, the analysis signal 200 is configured to incorporate additional identification information for identifying the search target finding unit 20 whose analysis signal generation means 25 generated the analysis signal 200, and the configuration further transmits the position information 500 generated by the GPS of the search target finding unit 20, so that the position measuring means 30 can easily ascertain location of the search target by receiving the analysis signal 200. Further, capture state of the electrical signal 100 transmitted from the search target can be timely ascertained, whereby moving state of the search target can be quickly ascertained, and when the search target finding unit 20 is constituted to be movable, the search target can be accurately found by moving the search target finding unit 20 to a position where the electrical signal 100 can probably be captured.

The network 40 is the transmission route of the electrical signal 100 and the analysis signal 200, and in the present embodiment, as shown in FIGS. 1 and 2, is constituted by the signal generation device 10, the one or more search target finding units 20, and the position measuring means 30. The network 40 can be configured to pass not only the electrical signal 100 and the analysis signal 200 but also various other information associated with finding the search target, such as the position information 500 from the GPS of the search target finding unit 20 and status information of the search target finding unit 20.

There now follows an explanation of a method of searching for a search target using the search and rescue system 1 according to present invention. The signal generation device 10 carried by the search target (300a or 300b) transmits the electrical signal 100 either constantly or upon being operated. The search target finding unit 20 receives the electrical signal 100 by the electrical signal receiving means 22. The electrical signal 100 received by the electrical signal receiving means 22 is analyzed by the analysis means 24. When the electrical signal 100 is determined to be a signal transmitted from the signal generation device 10, the analysis signal generation means 25 generates the analysis signal 200, and the communication means 26 sends the analysis signal 200 to the network 40 for transmission to another search target finding unit 20 with reception capability or to the position measuring means 30.

When the search target finding unit 20 receives the analysis signal 200 transmitted from another search target finding unit 20, it immediately resends the received analysis signal 200 to the network 40 for transmission to another search target finding unit 20 or the position measuring means 30. As a result, multiple search target finding units 20 continue to transmit the analysis signal 200 sequentially so that it is finally transmitted to the position measuring means 30, whereby an optimum transmission route can be selected even in a case where transmission distance is long, obstacles are present in the transmission path, or the search target finding unit 20 needs to move to change the transmission route.

The position measuring means 30 confirms presence of the search target by receiving the analysis signal 200 and uses the position information 500 of the search target finding unit 20 to analyze the position of the search target. When there are multiple search target finding units 20, the location of the search target is determined more exactly by analyzing the position information 500 of the search target finding units 20 that are the transmission sources of the analysis signals 200 received by the multiple transmissions.

Moreover, the position measuring means 30 is configured to detect interruption of analysis signal 200 reception by the search target finding unit 20 and to have control function for controlling communication route of the analysis signal 200. Owing to this configuration, transmission/reception can be continued with no interruption of analysis signal 200 transmission/acquisition, so that stable transmission of the analysis signal 200 without a break can be achieved.

As shown in FIGS. 1 and 2, the one or more search target finding units 20 can be configured each to be installed on a separate movable mobile unit 400. When the mobile units 400 are constituted by automobiles, for example, this configuration enables the search target finding units 20 to communicate with one another or with the position measuring means 30 while the search target finding units 20 are moving, whereby the communication route comes to be fluidly configured so that aggressive searches for the lost article 300a, lost person 300b or other search target can be pursued and fluid configuration of the search range becomes possible.

As shown in FIG. 2, the mobile unit 400 can be constituted in multiple units as aerial vehicles capable of flying movement. Particularly when the search target is the lost person 300b, this configuration makes it possible to realize an arrangement whereby the individual search target finding units 20 mounted on the aerial vehicles form a fluid network and search for the lost person 300b while communicating with one another, so that the search for the search target can be performed flexibly and efficiently, and the search for the lost person 300b can be performed safely and reliably within the range interconnected by the network even in snowy mountainous areas, at sea, and in other such places not easily accessible by human searchers. In the present embodiment, the aerial vehicles are small aircraft or drones. As a result, when aircraft are used, the approximate location of the lost person 300b can be rapidly ascertained, and when drones are used, the location of the lost person 300b can be ascertained more exactly.

The network 40 constituted by the signal generation device 10, search target finding unit(s) 20 and position measuring means 30 can be configured as a wireless network. In addition, the network 40 can be constituted as a mesh network. Such a configuration enables arbitrary selection of the transmission route of the electrical signal 100 from the signal generation device 10 and the analysis signal 200 to the position measuring means 30. Namely, a network matched to any scale and range can be configured, so that a flexible system for carrying out searches for the lost article 300a, lost person 300b or other search target can be built that ensures more efficient rescue particularly when using drones or the like to conduct an airborne search for the lost person 300b.

As pointed out earlier, the position measuring means 30 has network management function, namely, it is configured to detect cutoff and other problems of the network 40 and take measures to ensure suitable transmission routes, but the individual search target finding units 20 can also be configured to incorporate routing function. Doing this enables fine-grained routing control and facilitates securement of optimum transmission route particularly in a mesh-like wireless network.

As shown in FIGS. 1 and 2, a GPS receiver 28 can be mounted in the search target finding unit 20. In the present embodiment, when the electrical signal receiving means 22 receives the electrical signal 100 transmitted from the signal generation device 10, the GPS receiver 28 acquires the position information 500 (GPS information) of the search target finding unit 20. The communication means 26 is configured to thereafter transmit the position information 500 through the network 40 to another search target finding unit 20 or the position measuring means 30. As alternative configurations, the position information 500 can be included in and transmitted with the data of the analysis signal 200 or be transmitted separately of the analysis signal 200. When transmitted separately of the analysis signal 200, a configuration is preferably adopted whereby the position information 500 is associated with the analysis signal 200 for transmission to the network 40.

The position measuring means 30 is configured to analyze position of the search target by performing three-point measurement upon receiving multiple sets of position information 500 transmitted from the search target finding units 20 receiving the electrical signal 100. Specifically, for example, when three or more sets of the position information 500 are being received, it follows that a lost article 300a, lost person 300b or other search target exists at a location where regions of 100 m radius from the respective positions overlap. Particularly noteworthy is that in the present embodiment even when the sets of position information 500 are more than 100 m away, information of the search target can be determined with high accuracy, and it is especially significant that the lost person 300b can be quickly found even in a place with severe undulations such as in the mountains.

EXPLANATION OF SYMBOLS

1 Search and rescue system
10 Signal generation device
20 Search target finding unit
22 Electrical signal receiving means
24 Analysis means
25 Analysis signal generation means
26 Communication means
28 GPS receiver
30 Position measuring means
40 Network
100 Electrical signal
200 Analysis signal
300a Lost article
300b Lost person
400 Mobile unit
500 Position information

The invention claimed is:

1. Search and rescue system to find a search target and measure position thereof, comprising:
   a signal generator carried by a search target to transmit an electrical signal over a network;
   a plurality of search target finders, each search target finder comprising an electrical signal receiver to receive an electrical signal, an analyzer to analyze the received electric signal and determine whether the received electrical signal is a signal transmitted from the signal generator, an analysis signal generator to generate an analysis signal based on a result of the analysis, and a transmitter/receiver to transmit/receive the analysis signal over the network;
   a position measurer to receive the analysis signal transmitted from a first search target finder over the network and to measure a position of the search target; and
   wherein the first search target finder ascertains a presence of the search target based on a reception, by the electrical signal receiver, of the electrical signal intermittently or continuously transmitted from the signal generator carried by the search target, the transmitter/receiver transmits/receives the analysis signal generated by the analysis signal generator to a second search target finder or the position measurer over the network in response to a determination that the received electrical signal is a signal transmitted from the signal generator;
   wherein the second search target finder receives the analysis signal transmitted from the first search target finder and transmits the analysis signal to another search target finder or the position measurer;
   wherein the position measurer receives the analysis signal transmitted from the first search target finder, confirms existence of the search target, detects interruption in analysis signal reception, and controls a communication route of the analysis signal so as to continue with an acquisition of the analysis signal;
   wherein each of said plurality of search target finders is mounted on a movable mobile vehicle, each search target finder communicates with other search target finders or the position measurer while said each search target finder is moving;
   wherein said movable mobile vehicle is an aerial vehicle; and
   wherein said each search target finder comprises a GPS receiver and transmits a position information of said each target finder acquired by the GPS receiver over the network to another search target finder or the position measurer; and wherein the position measurer receives multiple sets of position information transmitted from said plurality of search target finders and analyzes the position of the search target by performing a three-point measurement.

2. The search and rescue system of claim 1, wherein the network constitutes a wireless network having a mesh network configuration and is configured to enable an arbitrary selection of a signal transmission path from the signal generator to the position measurer.

* * * * *